(12) United States Patent
Shiga et al.

(10) Patent No.: US 8,944,110 B2
(45) Date of Patent: Feb. 3, 2015

(54) VENT DUCT

(71) Applicant: Roki Co., Ltd., Hamamatsu-shi, Shizuoka (JP)

(72) Inventors: Takeki Shiga, Hamamatsu (JP); Takahiro Amano, Hamamatsu (JP); Masaharu Hirai, Hamamatsu (JP)

(73) Assignee: Roki Co., Ltd., Shizuoka (JP)

( * ) Notice: Subject to any disclaimer, the term of this patent is extended or adjusted under 35 U.S.C. 154(b) by 69 days.

(21) Appl. No.: 13/848,349

(22) Filed: Mar. 21, 2013

(65) Prior Publication Data

US 2013/0248044 A1 Sep. 26, 2013

(30) Foreign Application Priority Data

Mar. 26, 2012 (JP) ................. 2012-069892
Sep. 7, 2012 (JP) ................. 2012-197183

(51) Int. Cl.
| | | |
|---|---|---|
| F15D 1/04 | (2006.01) | |
| F16L 9/00 | (2006.01) | |
| F02M 35/10 | (2006.01) | |
| F02M 35/12 | (2006.01) | |
| F16L 43/00 | (2006.01) | |
| F24F 13/22 | (2006.01) | |
| F24F 13/02 | (2006.01) | |
| F24F 13/08 | (2006.01) | |

(52) U.S. Cl.
CPC ............ *F16L 9/00* (2013.01); *F02M 35/10262* (2013.01); *F02M 35/1211* (2013.01); *F02M 35/10124* (2013.01); *F16L 43/00* (2013.01); *F15D 1/04* (2013.01); *F24F 13/22* (2013.01); *F24F 13/02* (2013.01); *F24F 13/081* (2013.01); *Y02T 10/146* (2013.01)
USPC ............................................. 138/37; 138/39

(58) Field of Classification Search
USPC .............................................. 138/37, 39, 157
See application file for complete search history.

(56) References Cited

U.S. PATENT DOCUMENTS

| | | | |
|---|---|---|---|
| 2,590,797 A | | 3/1952 | Siciliano |
| 3,353,562 A | * | 11/1967 | Heskestad .................. 138/39 |
| 4,302,935 A | * | 12/1981 | Cousimano .................. 60/272 |
| 4,989,807 A | | 2/1991 | Foreman et al. |
| 5,213,138 A | * | 5/1993 | Presz, Jr. .................... 138/39 |
| 7,174,919 B2 | * | 2/2007 | Kenyon et al. ................. 138/37 |

FOREIGN PATENT DOCUMENTS

| | | |
|---|---|---|
| DE | 10 2007 023 119 A1 | 11/2008 |
| EP | 1 455 081 A1 | 9/2004 |
| JP | 2002-156977 A | 5/2002 |
| WO | 2008/132406 A2 | 11/2008 |
| WO | 2009/127192 A1 | 10/2009 |

* cited by examiner

*Primary Examiner* — Patrick F Brinson
(74) *Attorney, Agent, or Firm* — Sughrue Mion, PLLC

(57) ABSTRACT

A vent duct having an inner fluid flow passage includes a bent portion formed to a duct body portion at which the fluid flow passage is bent, and a protruded portion formed on a downstream side of the bent portion so as to protrude from an inner peripheral surface portion toward an axial center of the fluid flow passage, wherein the protruded portion includes an upstream side end portion formed to be gently continuous to the inner peripheral surface portion of a downstream side portion of the bent portion, a body portion extending from the upstream side end portion toward the downstream side portion along the fluid flow passage, and a downstream side end portion along the fluid flow passage to be continuous to the body, the downstream side end portion of the protruded portion being formed to be perpendicular to the inner peripheral surface portion.

7 Claims, 11 Drawing Sheets

FIG. 9
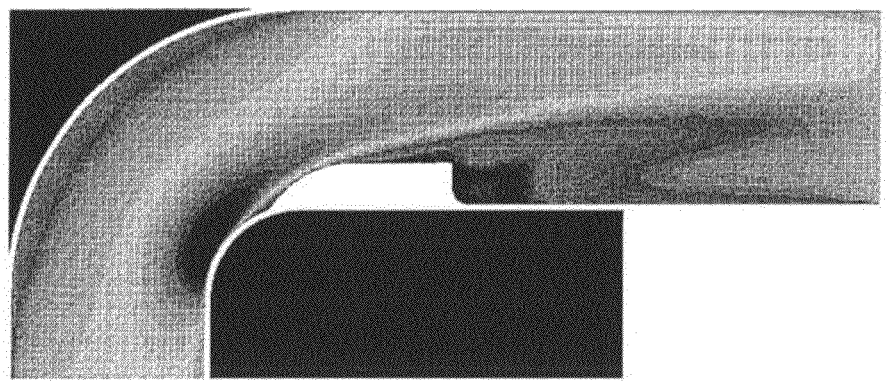
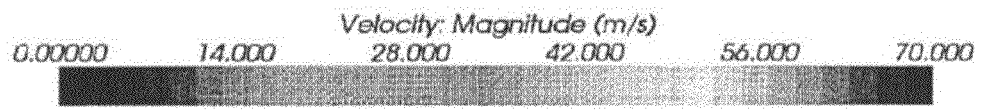
FIG. 10
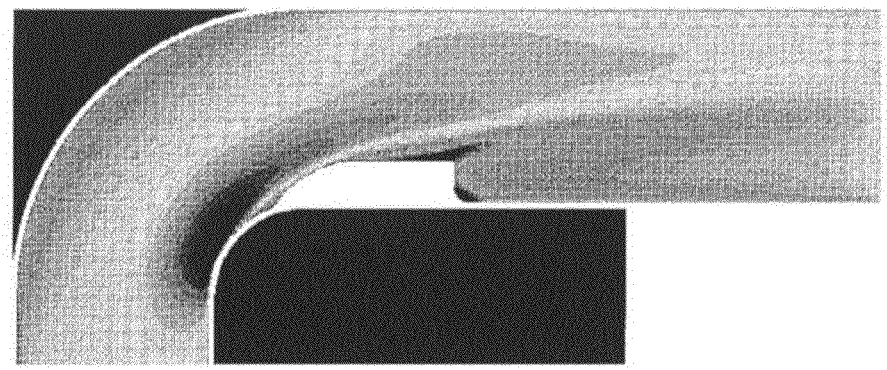
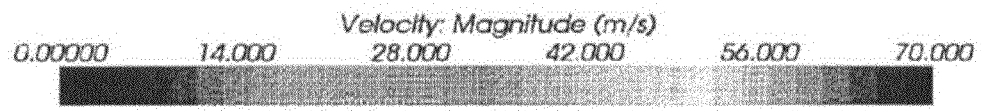

US 8,944,110 B2

VENT DUCT

BACKGROUND OF THE INVENTION

1. Field of the Invention

The present invention relates to a vent (ventilation) duct particularly having a cylindrical structure mounted for introducing an outdoor air into an internal combustion engine.

2. Related Art

In a conventional technology, a cylindrical vent (ventilation) duct for introducing outdoor air into an internal combustion engine has been provided, and for such a vent duct, various means and attempts have been performed for the purpose of reducing ventilation air-flow resistance in order for appropriately introducing and guiding the outdoor air flow.

One of such means is provided by Japanese Patent Laid-open Publication No. 2002-156977 (Patent Document 1) as silencing device in which a guide block having a semi-circular cross-section and attaining acoustic function is provided on an inner peripheral surface at an inner downstream side of a bent (curved) portion of a duct.

The silencing device disclosed in the above Patent Document 1 is provided with the guide block having a semi-circular cross-section and having acoustic function is provided on an inner peripheral surface at an inner downstream side of a bent portion of a duct, so that peel-off of fluid at the bent portion can be prevented by the provision of the guide block, as well as reducing noise level.

According to the structure of the conventional vent duct mentioned above, although the guide block has a semi-circular cross section, because of tendency of compact structure of an engine room of an automobile or location of various kinds of auxiliary components or parts, there has been caused constriction or restriction to free layout of the vent duct, and accordingly, it has been required to further reduce ventilation resistance without making enlarge the structure or configuration of the vent duct.

SUMMARY OF THE INVENTION

The present invention was conceived in consideration of the circumstances mentioned above and an object thereof is to provide a vent duct capable of further reducing ventilation fluid-flow resistance without increasing size or dimension of the vent duct.

The above and other objects can be achieved according to the present invention by providing a vent duct having an inner fluid flow passage defined by an inner peripheral surface portion of the vent duct, the vent duct including: a duct body portion having an inner fluid flow passage; a bent portion formed to the duct body portion at which the fluid flow passage is bent; and a protruded portion formed on a downstream side of the bent portion so as to protrude from the inner peripheral surface portion toward an axial center of the fluid flow passage, wherein the protruded portion includes an upstream side end portion formed to be gently continuous to the inner peripheral surface portion of a downstream side portion of the bent portion, a body portion extending from the upstream side end portion of the protruded portion toward the downstream side portion along the fluid flow passage, and a downstream side end portion along the fluid flow passage to be continuous to the body, the downstream side end portion of the protruded portion being formed to be perpendicular to the inner peripheral surface portion.

In the above aspect, the following preferred mode may be provided.

It may be desired that the protruded portion has a substantially circular-arc shape in cross section in the fluid flow direction in the fluid flow passage.

It may be desired that the body portion has a width along a diameter direction formed to be gradually narrowed toward the perpendicular surface portion formed at the downstream side end portion of the protruded portion.

The body portion may have an inner hollow structure having an opening opened to an external side of the fluid flow passage, and the perpendicular surface portion of the protruded portion is formed with an adjustment hole so as to communicate with the external side of the fluid flow passage through the opening formed to the inner hollow structure.

The body portion may have an inner hollow structure, and the perpendicular surface portion of the protruded portion is formed with an adjustment hole communicated with an inside of the inner hollow structure of the body portion.

The protruded portion may have a hog-backed shape in cross section.

The vent duct may be composed of halved split duct parts.

It is further to be noted that the above aspect and modes of the present invention are not all the necessary features for the present invention and sub-combination of these features may constitute the present invention.

According to the present invention of the structures and characters mentioned above, since the protruded portion includes an upstream side end portion formed to be gently continuous to the inner peripheral surface portion of a downstream side portion of the bent portion, a body portion extending from the upstream side end portion toward the downstream side portion along the fluid flow passage, and a perpendicular portion formed at the downstream side end portion along the fluid flow passage to be continuous to the body, the vent duct can attain preferred function of reducing air-flow resistance without being enlarged in size or dimension.

The nature and further characteristic features of the present invention may be made clearer from the following descriptions made with reference to the accompanying drawings.

BRIEF DESCRIPTION OF THE DRAWINGS

In the accompanying drawings:

FIG. 9 shows an analysis result of flow rate distribution in the vent duct according to the first embodiment;

FIG. 10 shows an analysis result of flow rate distribution in the vent duct according to the second embodiment;

DESCRIPTION OF THE PREFERRED EMBODIMENT

The preferred embodiments of the present invention will be described hereunder with reference to the accompanying drawings. It is further to be noted that embodiments described hereinbelow do not limit the present invention recited in all the pending claims and that all the combinations of the characteristic features explained in the following embodiments are not always essential for the solution of the present invention.

First Embodiment

Figure 1:
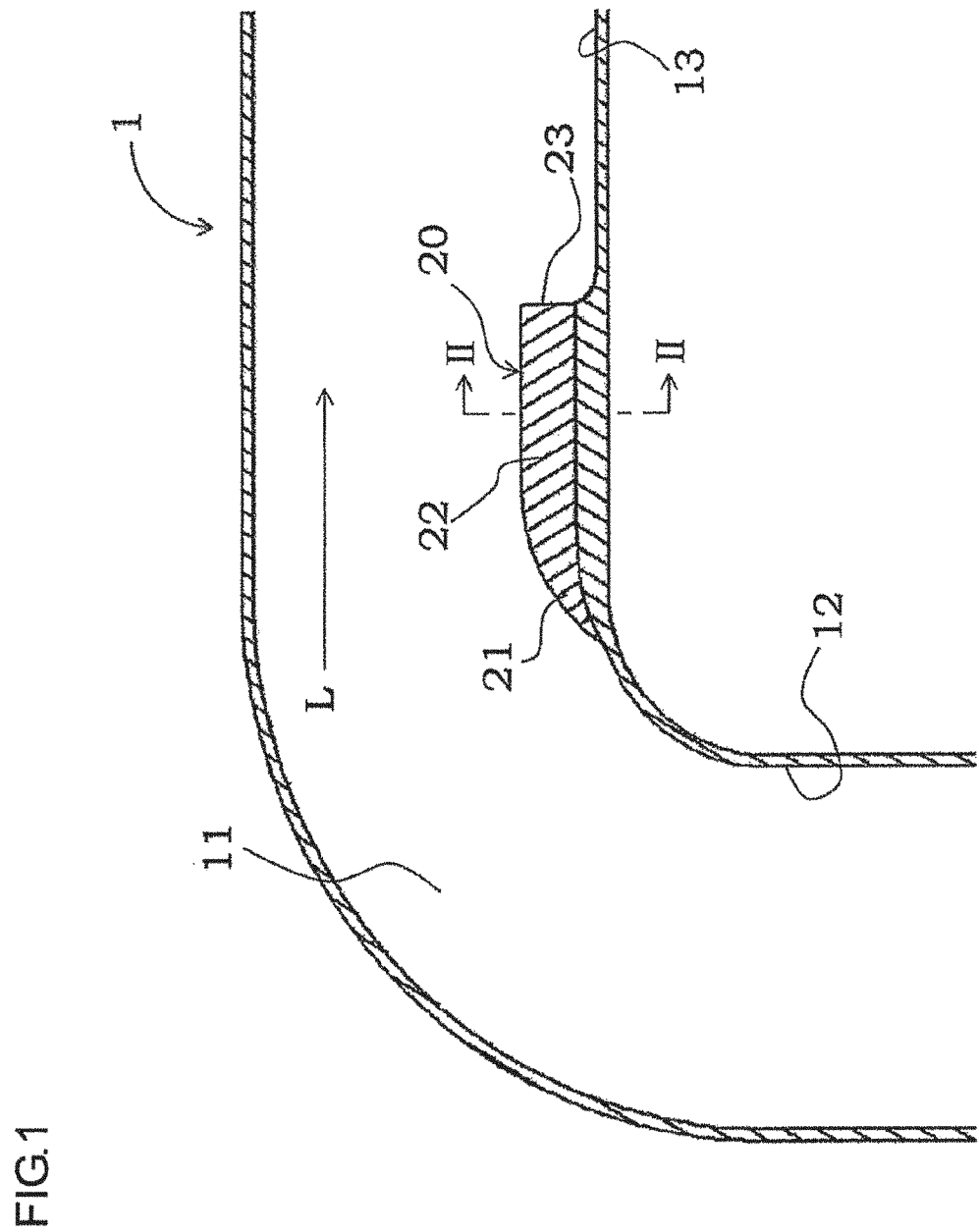
FIG. 1 is a sectional view showing a structure of a vent (ventilation) duct according to a first embodiment of the present invention.

A first embodiment will be described with reference to FIGS. 1 and 2, and as shown in FIG. 1, a vent (or ventilation) duct 1 according to this first embodiment has duct body portion in which a passage formed in an inner periphery thereof, and the passage is bent to form a bent (curved) portion 11. A protruded portion 20 is formed to a portion of the inner peripheral surface of the vent duct 1 so as to protrude inward at a position downstream side of the bent portion 11.

Further, the vent duct 1 of the present embodiment is formed of a thermoplastic synthetic resin such as polypropylene group resin material, polyamide group resin material, or the like resin material, and the protruded portion 20 is formed integrally with the vent duct 1 at the time of injection molding process.

The protruded portion 20 is formed from an upstream side (front side) end portion 21 gently continuous to the inner peripheral surface 12 on the upstream side of the bent portion 11 in the fluid-flow passage and a body portion 22 extending along the extending direction L. At a downstream side (rear side) end portion on the downstream side of the body portion 22, a perpendicular surface portion 23 is formed so as to perpendicularly to an inner peripheral surface 13 of the vent duct 1 at the downstream side end of the body portion 22 of the protruded portion 20. The intersecting point of the perpendicular surface portion 23 and the inner peripheral surface portion 13 is formed so as to provide a curved shape having an R-section to be gently continuous to each other.

Figure 2:
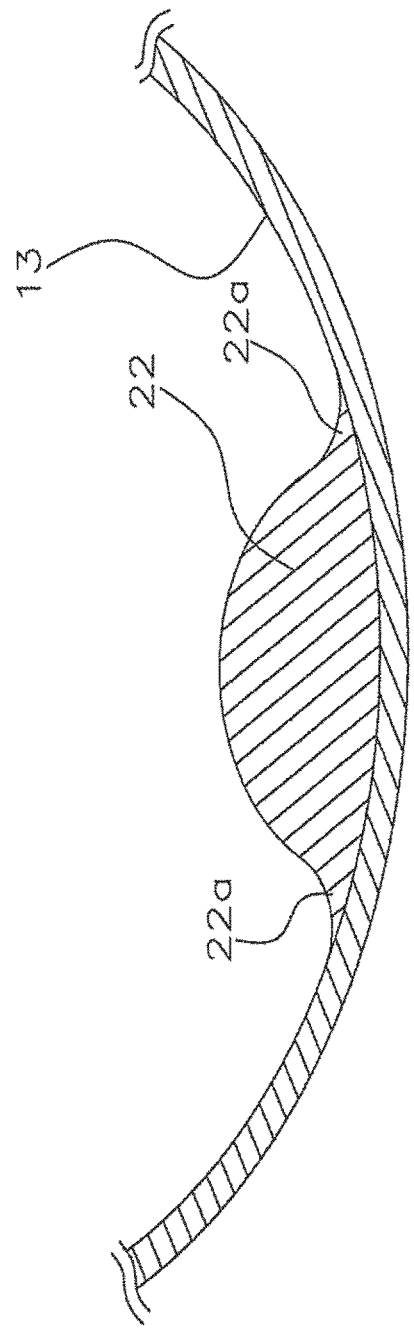
FIG. 2 is a sectional view taken along the line II-II in FIG. 1.

As shown in FIG. 2, the protruded portion 20 has a substantially circular-arc cross section having a central portion protruding toward the axial center of the passage of the vent duct 1, and lateral end portions 22a are formed gently continuously to the positions of the downstream side inner peripheral portion 13.

Figure 3:
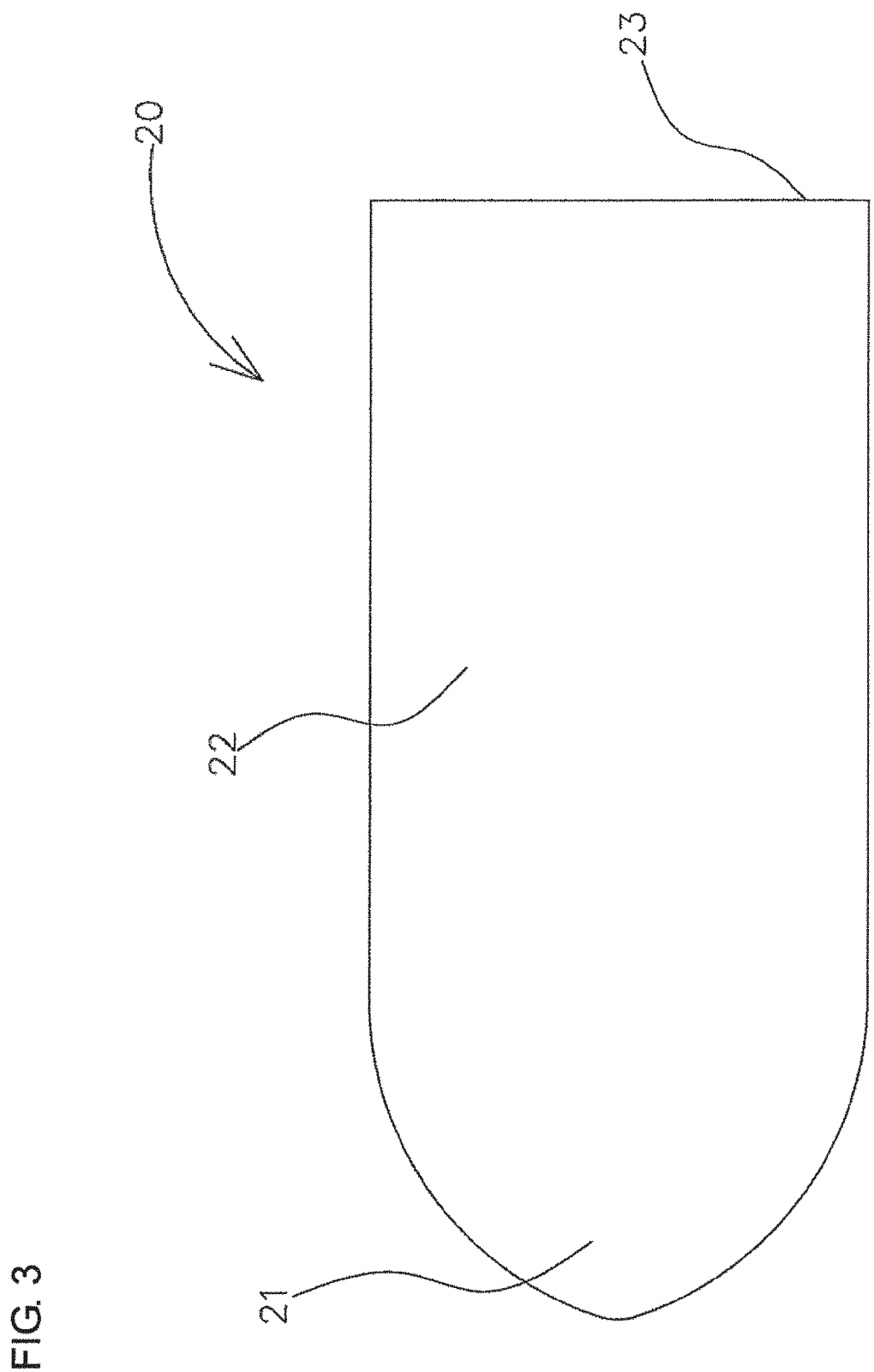
FIG. 3 is a plan view illustrating a shape of a protruded portion of the vent duct shown in FIG. 1.

The body portion 22 is formed, as shown in FIG. 3, so as to extend along the direction L extending toward the downstream side in the passage of the vent duct 1, and the front side end portion of is formed so as to provide a tapered shape toward the front end side so as to be gently continuous to the upstream side inner peripheral surface portion 12.

According to the vent duct of the first embodiment of the present invention, the protruded portion 20 of the configuration mentioned above, back flow of fluid such as air at the bent portion 11 can be effectively suppressed and provides a smooth flow thereof. Hence, it becomes possible to make compact the structure or configuration of the vent duct as well as reduce air-flow resistance.

In the forgoing first embodiment of the present invention, although the body portion 22 of the protruded portion 20 of the vent duct 1 extends downwardly along the extending direction of the air flow passage, the present invention is not limited to the shape of the body portion 22 as described, and another shape may be adopted such as one described hereunder as a second embodiment.

Second Embodiment

Fig. is an illustrated plan view showing an outer shape of a protruded portion formed to the vent duct according to a second embodiment of the present invention. It is further to be noted that the same reference numerals are denoted to portions or parts corresponding to those of the first embodiment shown in FIGS. 1 to 3, and detailed explanations will be omitted herein.

Figure 4:
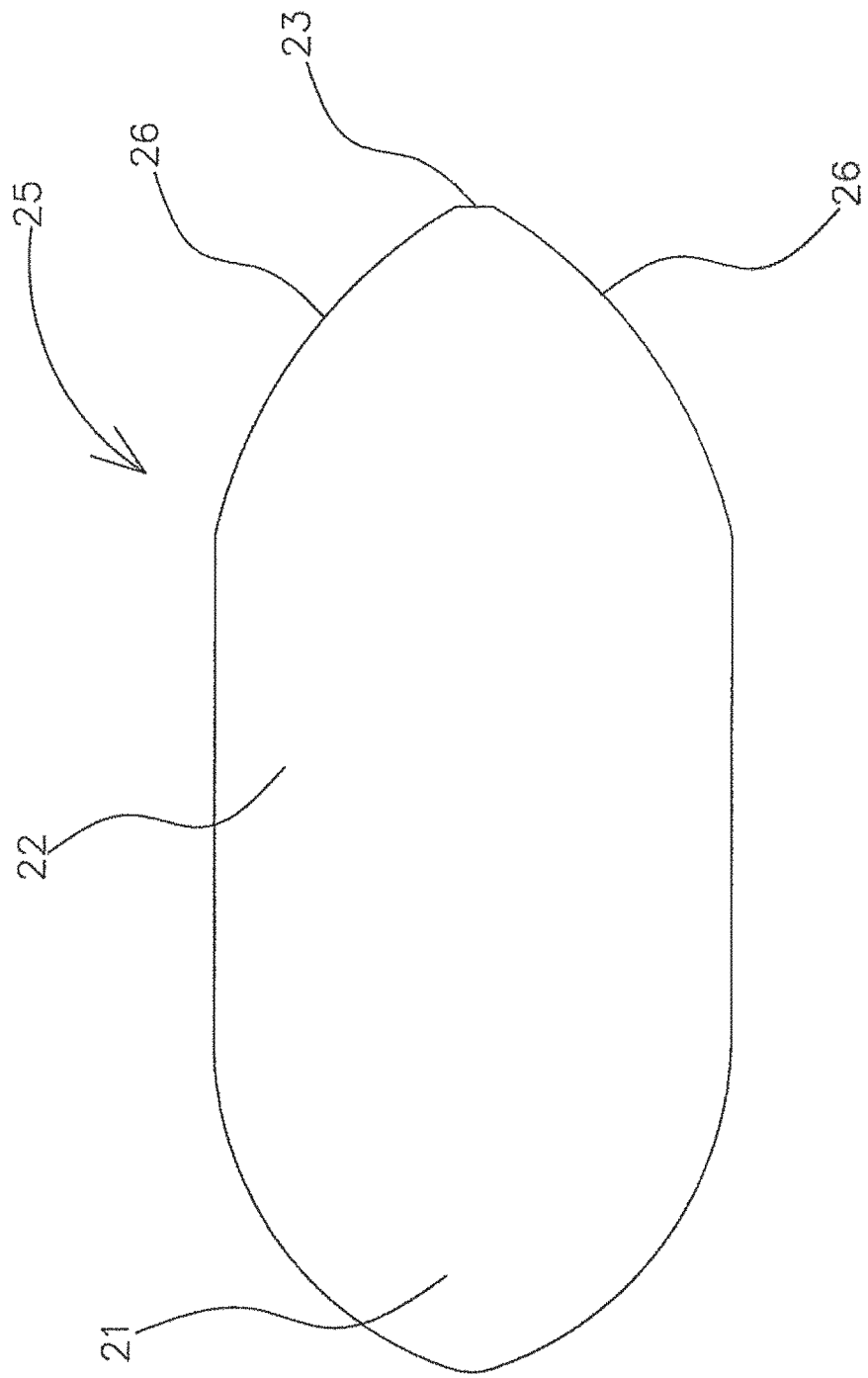
FIG. 4 is a plan view illustrating a shape of a protruded portion of the vent duct according to a second embodiment of the present invention.

With reference to FIG. 4, a protruded portion 25 of the vent duct of the present embodiment has the upstream side end portion 21 of the body 22 having the shape extending toward the downstream side of the passage, which is similar to that of the protruded portion 20 of the first embodiment shown in FIG. 3, but the shape of the downstream side end portion 23 differs from that of the protruded portion 20 of the first embodiment.

The protruded portion 25 of the vent duct of the present embodiment has a downstream side end portion of the body portion having a width gradually reduced toward the perpendicular surface portion 23 so as to form slope portions 26. Although the slope seems to be formed in a plane shape, it may be preferred to be formed in a circular-arc shape to obviate stagnation of air-flow.

As mentioned above, since the slope portions 26 are formed to the downstream side end portion of the body portion 22, the air-flow in the diametrical direction of the vent duct can be made smooth and gentle, which results in realization of compact structure or configuration of the vent duct and reduction of air-flow resistance in the vent duct.

In the above embodiments, although the vent duct having the protruded portion 20 (25) are described as a solid portion, the protruded portion is not limited to have such shape, and a third embodiment, for example, of a vent duct will be explained hereunder.

Third Embodiment

Figure 5:
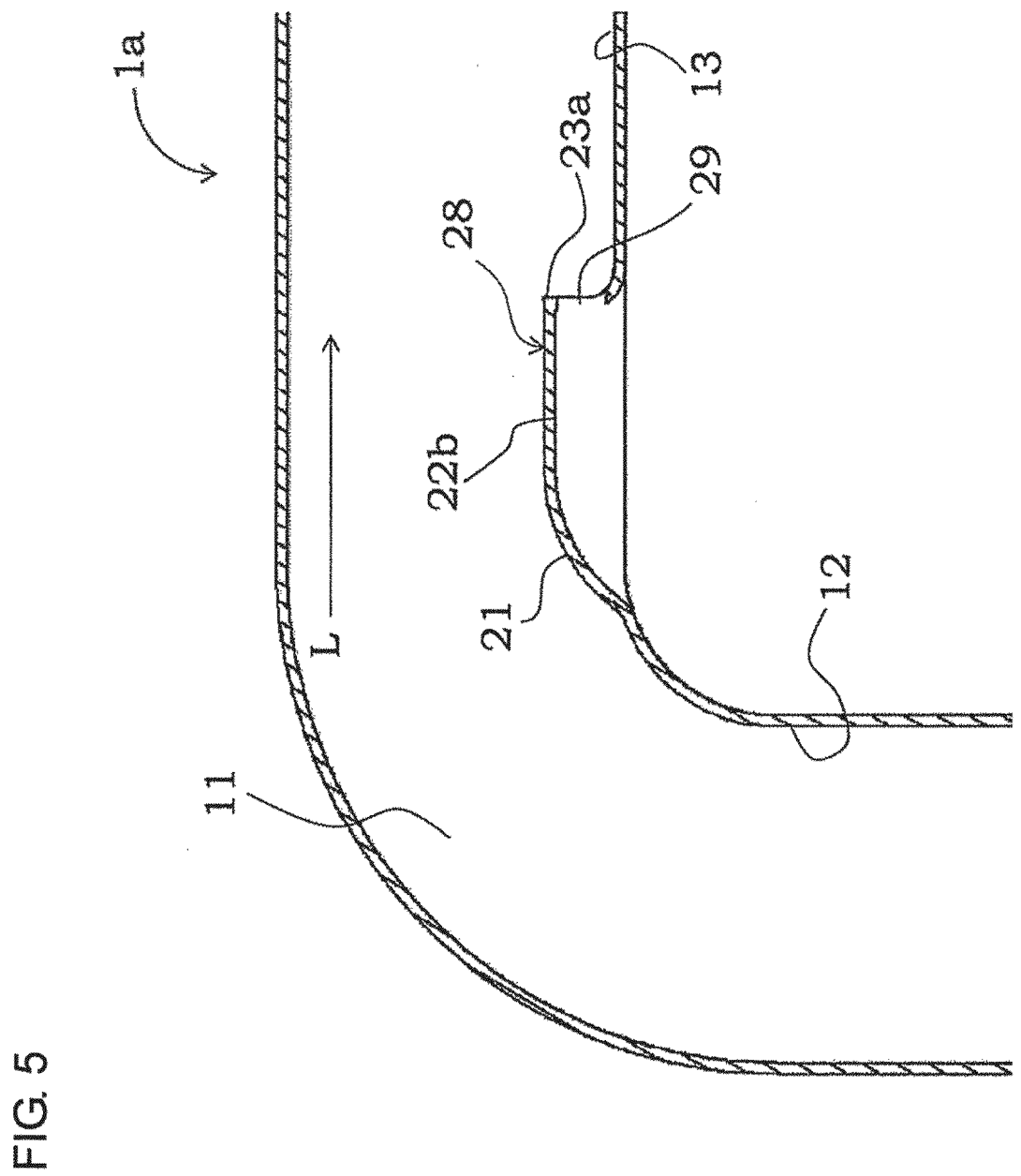
FIG. 5 is a sectional view showing a structure of a vent duct according to a third embodiment of the present invention.

FIG. 5 is a sectional view, similar to that of FIG. 1, showing a structure of a vent duct according to the third embodiment of the present invention. It is further to be noted that the same reference numerals are denoted to portions or parts corresponding to those of the first or second embodiment shown in FIGS. 1 to 4, and detailed explanations will be omitted herein.

As shown in FIG. 5, a protruded portion 28 of a vent duct 1a according to the present third embodiment has a structure such that a downstream side duct wall is raised toward the axial center of the passage in the vent duct 1a so as to provide a hollow structure having an opening opened outward of the vent duct 1a. Furthermore, a through hole as an adjustment hole 29 is formed in a perpendicular surface portion 23a formed to the downstream side end of the body portion 22b, and the adjustment hole 29 is communicated to an external side of the vent duct 1a through the opening formed in the inner hollow structure of the body portion 22b.

The adjustment hole 29 has a function of a tuning hole, and accordingly, can attain function to suppress or restrict noise such as suction noise generated in an internal combustion engine without separately locating a silencing means such as resonating member. Further, since the adjustment hole 29 is formed to the perpendicular surface portion 23a, external air is sucked through the adjustment hole 29. According to such external air suction, the stagnation of the air flow near the perpendicular surface portion 23a can be obviated, the air-flow resistance can be further reduced without making large the structure at of the vent duct 1a.

On the other hand, in the first to third embodiments mentioned above, the bent portion 11 of the vent duct is bent substantially at right angles. However, the bent portion of the vent duct of the present invention is not limited to such shape and another structure or shape may be adopted, for example, as explained hereunder as a fourth embodiment.

Fourth Embodiment

Figure 6:
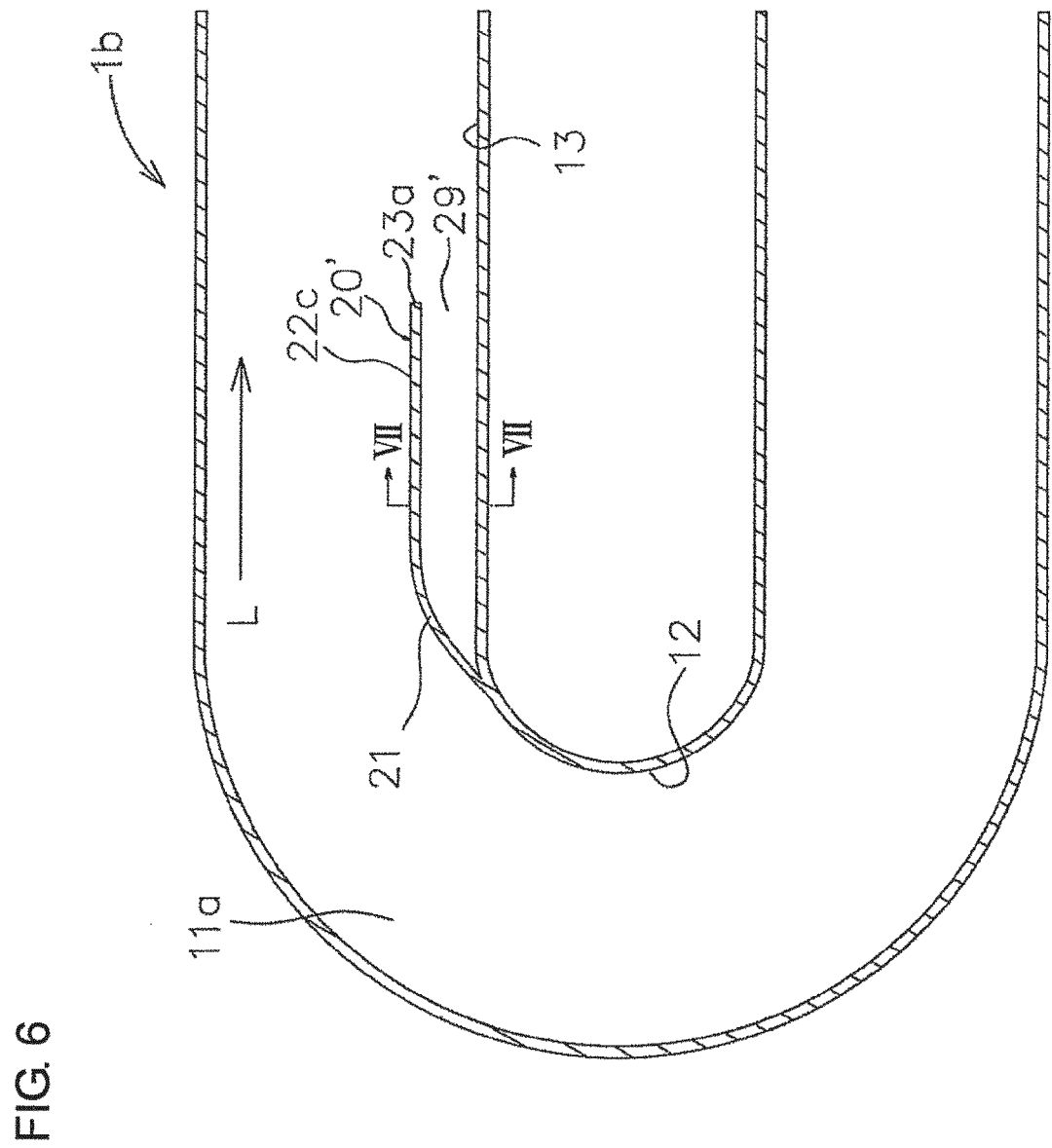
FIG. 6 is a sectional view showing a structure of a vent duct according to a fourth embodiment of the present invention.
Figure 7:
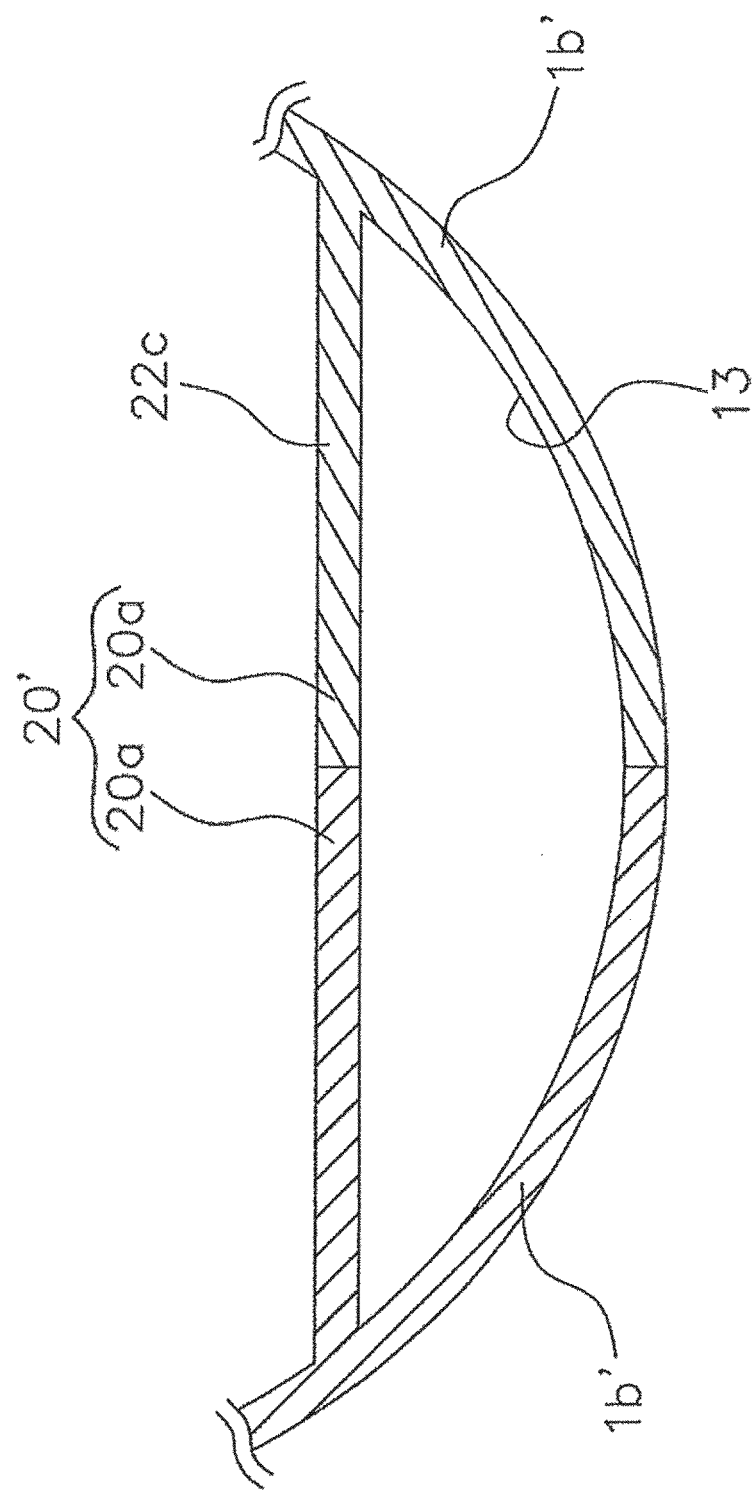
FIG. 7 is a sectional view taken along the line VII-VII in FIG. 6.

FIG. 6 is a sectional view showing a structure of a vent duct according to a fourth embodiment of the present invention, and FIG. 7 is a sectional view taken along the line VII-VII in FIG. 6. It is further to be noted that the same reference numerals are denoted to portions or parts corresponding to those of the first or third embodiment shown in FIGS. 1 to 5, and detailed explanations will be omitted herein.

As shown in FIG. 6, a vent duct 1b of this fourth embodiment has a bent portion 11a bent at substantially 180 degrees so as to provide a U-shape in section. In such structure of the vent duct 1b, it is difficult to form a protruded portion on the inner peripheral surface portion of the vent duct 1b so as to swell on an inner side of the passage of the U-shaped vent duct 1b by means of molding process. Therefore, the vent duct 1b of the present embodiment is formed by coupling halved ducts 1b', which are split into two parts along the extending direction L as shown in FIG. 7.

With reference to FIG. 7, a protruded portion 20' is formed by abutting ribs 20a, 20a provided in a manner standing toward opposing halved ducts 1b' to each other from the inner peripheral surface portion 13 on the downstream side of the halved ducts 1b' so as to provide a hog-backed shape in section. Further, since the ribs 20a and 20a abut against each other, the body portion 22c of the vent duct has an inner hollow structure.

Moreover, as shown in FIG. 6, the protruded portion 20' is provided with a front side (upstream side) end portion 21 continuous to the upstream side inner peripheral surface portion 12 at the bent portion 11a and a body portion 22c extending along the extension direction L in the downstream side passage of the vent duct 1b. The downstream side end portion of the body portion 22c is formed as a perpendicular surface portion 23a at right angles with respect to the downstream side inner peripheral surface portion 13, and the perpendicular surface portion 23a is formed with an adjustment hole 29' so as to establish communication between the interior of the body portion 22c and the interior of the vent duct 11b.

As mentioned above, the vent duct 1b according the present embodiment, since the inner periphery of the U-shaped vent duct is reduced in diameter on the downstream side of the bent portion 11a, the air-flow resistance can be reduced as well as reduction of air suction noise.

[Experimental Results]

Figure 8:
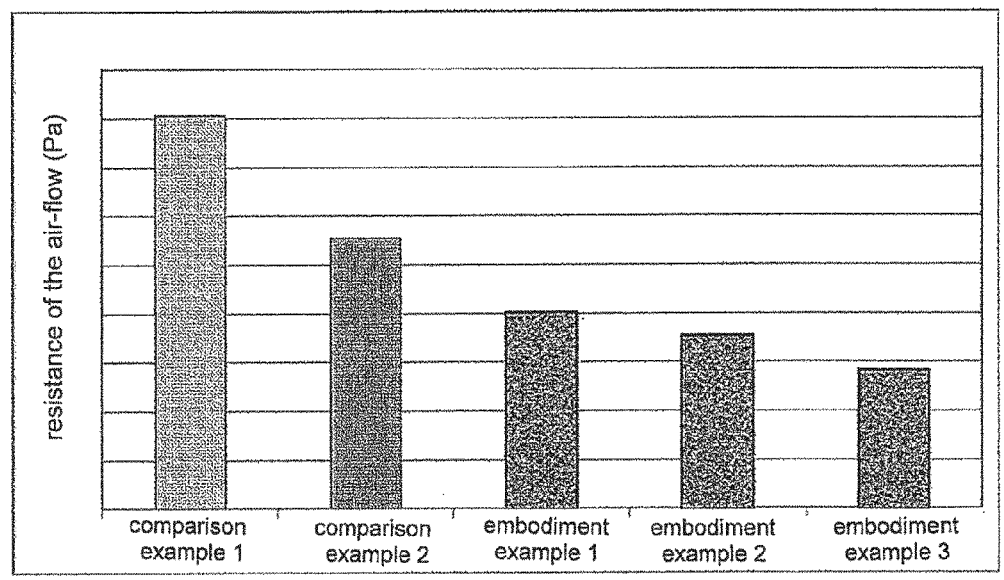
FIG. 8 is a graph representing comparison result in ventilation resistances according to a vent duct having conventional structure and the vent ducts according to the first to third embodiment of the present invention.

FIG. 8 is a graph representing result of comparison in air-flow resistance achieved by the vent ducts of the examples 1 to 3 according to the first to third embodiments of the present invention, a vent duct provided with no protruded portion, and a conventional vent duct having a protruded portion.

In the graph of FIG. 8, a Comparison Example 1 represents the air-flow resistance of the vent duct having no protruded portion, and a Comparison Example 2 represents the air-flow resistance of the conventional vent duct.

As can be seen from the comparison results, of the graph of FIG. 8, the air-flow resistance of the vent duct 1 according to the first embodiment of the present invention is reduced by 9.4% in comparison with that of the Comparison Example 1, and is also sufficiently reduced in comparison with the Comparison Example 2.

Furthermore, the air-flow resistance of the vent duct according to the second embodiment of the present invention is reduced by 10.5% in comparison with that of the Comparison Example 1, and is also sufficiently reduced in comparison with the Comparison Example 2.

Moreover, the air-flow resistance of the vent duct 1a according to the third embodiment of the present invention is reduced by 12.1% in comparison with that of the Comparison Example 1, and is also sufficiently reduced in comparison with the Comparison Example 2.

As mentioned above, according to the vent ducts of the first and third embodiments of the present invention, the air-flow resistance can be remarkably reduced in comparison with the conventional vent duct, and in addition, the shape of the protruded portion protruded inward from the inner peripheral surface of the vent duct is specifically designed in detail, further reduction of the air-flow resistance can be achieved without making large the structure of the vent duct.

Hereunder, simulation results of the air-flow resistances of the conventional vent duct and the vent ducts according to the first to third embodiments of the present invention will be explained with reference to FIGS. 9 to 12.

Figure 11:
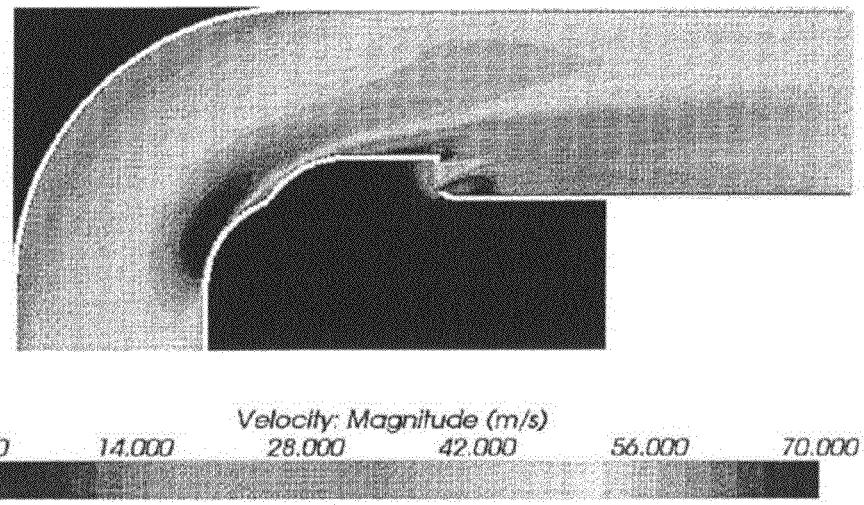
FIG. 11 shows an analysis result of flow rate distribution in the vent duct according to the third embodiment.

That is, FIG. 9 shows an analysis result of flow rate distribution in the vent duct according to the first embodiment; FIG. 10 shows an analysis result of flow rate distribution in the vent duct according to the second embodiment; FIG. 11 shows an analysis result of flow rate distribution in the vent duct according to the third embodiment; and FIG. 12 shows an analysis result of flow rate distribution in the conventional vent duct, in which the conventional duct in FIG. 12 is a vent duct having a protruded portion of the shape similar to that of the Comparison Example 2.

Figure 12:
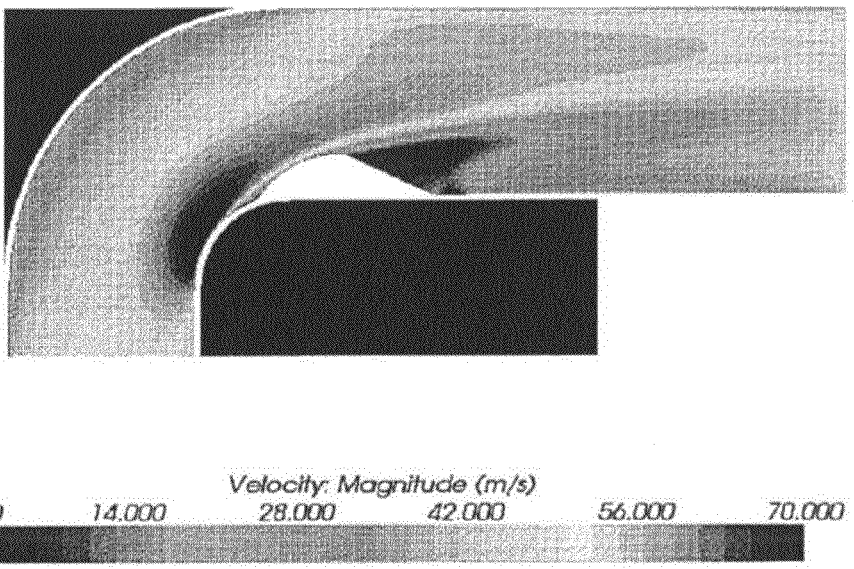
FIG. 12 shows an analysis result of flow rate distribution in the conventional vent duct.

As is apparent from FIG. 9, since the vent duct according to the first embodiment has the downstream side end of the protruded portion formed as perpendicular surface portion, it will be found that the lowering in flow speed on the downstream side of the protruded portion is suppressed in comparison with the conventional vent duct of FIG. 12, and hence, the peeling-off of the fluid flow from the duct wall is suppressed.

Furthermore, as is apparent from FIG. 10, the vent duct according to the second embodiment is constructed in the manner such that the dimension in the width direction of the protruded portion is gradually narrowed toward the downstream side of the air-flow, so that the degradation of the flow rate distribution becomes gentle and the peeling-off of the air flow from the duct inner peripheral wall can be further suppressed.

Still furthermore, as is apparent from FIG. 11, the vent duct according to the third embodiment is constructed in the manner of effectively solving the stagnation of the fluid caused at the downstream side end of the protruded portion by the introduction of the external air through the adjustment hole.

According to such elimination of the stagnation, the degradation of the flow rate distribution becomes gentle and the peeling-off of the air flow from the duct inner wall can be further suppressed.

As described herein above, according to the vent ducts of the first to third embodiments of the present invention, it is found that the effect of making gentle the flow rate distribution at the downstream side of the protruded portion can be realized, and in addition, at the bent (curved) portion of the vent duct, the peeling-off of the air-flow can be suppressed at the duct wall portion. Thus, the vent ducts of the first to third embodiment can suppress the resistance of fluid-flow (such as air-flow) passing through the vent duct can be suppressed by the fluid flow-rate function and fluid flowing function as mentioned above.

Figure 13:
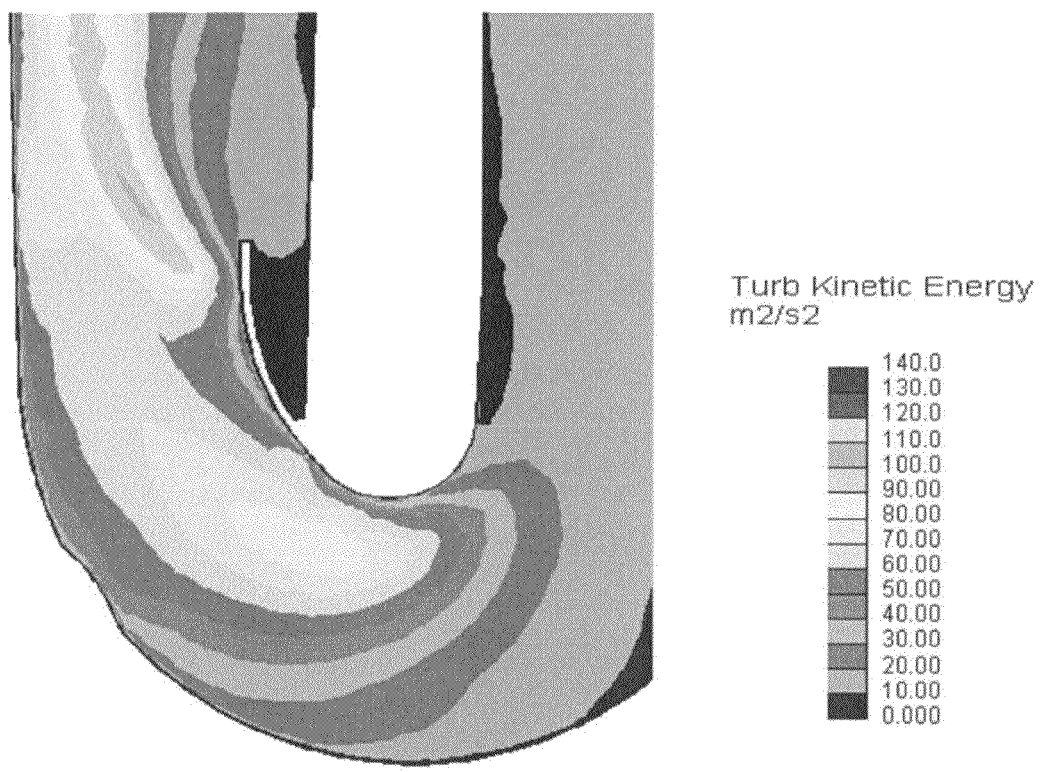
FIG. 13 shows an analysis result of a turbulence flow energy of a vent duct according to a fourth embodiment of the present invention.
Figure 14:
FIG. 14 shows an analysis result of a turbulence flow energy of the conventional vent duct.

Next, the simulation result of the air-flow resistances of the vent duct of the fourth embodiment and the vent duct of the conventional structure will be explained with reference to FIGS. 13 and 14, in which FIG. 13 shows an analysis result of the turbulence flow energy of the vent duct according to the fourth embodiment of the present invention, and FIG. 14 is an analysis result of the turbulence flow energy due to the conventional vent duct. Further, for the analysis of the conventional vent duct, there was used the vent duct 1b of the fourth embodiment from which the protruded portion 20' is cut off.

As is apparent from FIG. 13, it is found that since the vent duct according to the fourth embodiment is formed with the adjustment hole at the downstream side end portion of the protruded portion, the turbulence flow energy is evenly distributed in comparison with the case of the conventional vent duct shown in FIG. 14, and increasing of the air-flow resistance by the turbulence flow energy can be suppressed.

As mentioned above, according to the vent duct of the fourth embodiment, the resistance of the air-flow passing through the inside of the vent duct can be suppressed by the turbulence flow energy. In addition, since the vent duct has a portion downstream side of the bent portion so as to reduce the diameter thereof, so that the suction noise of the fluid such as air passing through the vent duct can be also effectively suppressed.

Still furthermore, with the vent ducts 1, 1a and 1b according to the first to fourth embodiments, although there were described the cases where the vent ducts have the bent portions 11 and 11a bent at angles of 90 degrees or 180 degrees, the shape of the bent portion is not limited to these shapes and may be changed optionally, and such change and modifications are within the technical range and/or scopes of the appended claims.

What is claimed is:

1. A vent duct having an inner fluid flow passage defined by an inner peripheral surface portion of the vent duct, the vent duct comprising:
    a duct body portion having an inner fluid flow passage;
    a bent portion formed to the duct body portion at which the fluid flow passage is bent; and
    a protruded portion formed on a downstream side of the bent portion so as to protrude from the inner peripheral surface portion toward an axial center of the fluid flow passage,
    wherein the protruded portion includes an upstream side end portion formed to be gently continuous to the inner peripheral surface portion of a downstream side portion of the bent portion, a body portion extending linearly from the upstream side end portion toward the downstream side portion along the fluid flow passage, and a downstream side end portion along the fluid flow passage to be continuous to the body, the downstream side end portion of the protruded portion being formed to be perpendicular to the inner peripheral surface portion.

2. The vent duct according to claim 1, wherein the protruded portion has a substantially circular-arc shape in cross section in the fluid flow direction in the fluid flow passage.

3. The vent duct according to claim 1, wherein the body portion has a width along a diameter direction formed to be gradually narrowed toward the perpendicular surface portion formed at the downstream side end portion of the protruded portion.

4. The vent duct according to claim 1, wherein the body portion has an inner hollow structure having an opening opened to an external side of the fluid flow passage, and the perpendicular surface portion of the protruded portion is formed with an adjustment hole so as to communicate with the external side of the fluid flow passage through the opening in the inner hollow structure.

5. The vent duct according to claim 1, wherein the body portion has an inner hollow structure, and the perpendicular surface portion of the protruded portion is formed with an adjustment hole communicated with an inside of the inner hollow structure of the body portion.

6. The vent duct according to claim 1, wherein the protruded portion has a hog-backed shape in cross section.

7. The vent duct according to claim 6, wherein the vent duct is composed of halved split duct parts.

* * * * *